US012151464B2

(12) United States Patent
Schwitzky et al.

(10) Patent No.: US 12,151,464 B2
(45) Date of Patent: Nov. 26, 2024

(54) DEVICE FOR PROVIDING SHEET-FORMAT SUBSTRATE SECTIONS AND PROCESSING WEB-FORMAT SUBSTRATE

(71) Applicant: KOENIG & BAUER AG, Würzburg (DE)

(72) Inventors: Volkmar Schwitzky, Meißen (DE); Christian Ziegenbalg, Weinböhla (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/702,940

(22) PCT Filed: Aug. 26, 2022

(86) PCT No.: PCT/EP2022/073795
§ 371 (c)(1),
(2) Date: Apr. 19, 2024

(87) PCT Pub. No.: WO2023/104361
PCT Pub. Date: Jun. 15, 2023

(65) Prior Publication Data

US 2024/0326403 A1 Oct. 3, 2024

(30) Foreign Application Priority Data

Dec. 7, 2021 (DE) ..................... 10 2021 132 121.2

(51) Int. Cl.
*B41F 5/24* (2006.01)
*B41F 13/02* (2006.01)
(Continued)

(52) U.S. Cl.
CPC ................ *B41F 5/24* (2013.01); *B41F 13/02* (2013.01); *B41F 13/60* (2013.01);
(Continued)

(58) Field of Classification Search
CPC .. B41F 5/24; B41F 13/02; B41F 13/60; B41F 23/0403; B41M 1/04; B41M 7/009
See application file for complete search history.

(56) References Cited

U.S. PATENT DOCUMENTS 6,350,342 B1 * 2/2002 Steidinger ................ G09F 3/10 156/239
8,827,397 B2 9/2014 Knauer
(Continued)

FOREIGN PATENT DOCUMENTS

CN 101524912 A 9/2009
CN 105196696 A 12/2015
(Continued)

OTHER PUBLICATIONS

International Search Report of PCT/EP2022/073795 dated Dec. 13, 2022.

*Primary Examiner* — David H Banh
(74) *Attorney, Agent, or Firm* — MATTINGLY & MALUR, PC

(57) ABSTRACT

Examples include a device for providing sheet-format substrate sections from a web-format substrate. The device includes a roll unwinder for inlet-side feeding of the web-format substrate. Two application devices act on the same first side of the web substrate, and are formed by coating units for supplying, to the same first side of the web substrate, a varnish that forms a barrier layer. A drying device is provided between a cross-cutting device and an upstream first coating unit and/or the drying device is provided in the substrate path between the two coating units and the cross-cutting device. The web-format substrate can be cut into sheet-format substrate sections and, at the outlet, the substrate sections can be provided for subsequent processing or output to a delivery unit.

15 Claims, 6 Drawing Sheets

(51) Int. Cl.
*B41F 13/60* (2006.01)
*B41F 23/04* (2006.01)
*B41M 1/04* (2006.01)
*B41M 7/00* (2006.01)

(52) U.S. Cl.
CPC ........... *B41F 23/0403* (2013.01); *B41M 1/04* (2013.01); *B41M 7/009* (2013.01)

(56) References Cited

U.S. PATENT DOCUMENTS

2005/0123685 A1* 6/2005 Frazzitta ................ B41M 7/009 427/532
2005/0150408 A1* 7/2005 Hesterman ......... G03G 15/6555 101/409
2006/0150838 A1* 7/2006 Hollings ............. B41F 13/0024 101/180
2006/0191426 A1* 8/2006 Timmerman ............. B26F 1/38 101/24
2006/0230965 A1* 10/2006 Thal ......................... B41M 7/02 101/483
2010/0080643 A1* 4/2010 Toshito .................. B65H 35/08 400/621
2011/0050767 A1 3/2011 Knauer
2011/0058885 A1 3/2011 Keilhau et al.
2017/0136785 A1* 5/2017 Katoh .................. B41J 11/0015
2019/0047298 A1* 2/2019 Hashimoto .......... B41J 11/0022
2020/0055307 A1* 2/2020 Ziegenbalg ........... B41F 19/007
2021/0170783 A1* 6/2021 Hendle ............... B41F 33/0036

FOREIGN PATENT DOCUMENTS

DE 10103040 A1 11/2001
DE 10351305 A1 5/2005
DE 102009061056 A1 6/2011
DE 202012102681 U1 8/2012
EP 2628593 A1 8/2013
EP 3878652 A1 9/2021
WO 2020/064230 A1 4/2020

* cited by examiner

DEVICE FOR PROVIDING SHEET-FORMAT SUBSTRATE SECTIONS AND PROCESSING WEB-FORMAT SUBSTRATE

CROSS-REFERENCES TO RELATED APPLICATIONS

This application is the US national phase, under 35 USC § 371, of PCT/EP2022/073795, filed on Aug. 26, 2022, published as WO 2023/104361 A1 on Jun. 15, 2023, and claiming priority to DE 10 2021 132 121.2, filed Dec. 7, 2021, and all of which are expressly incorporated by reference herein in their entireties.

TECHNICAL FIELD

Some examples relate to a device for providing sheet-format substrate sections, as well as to a machine and a method for treating and/or processing a web-format substrate. For example, the device for providing sheet-format substrate sections includes a roll unwinder for the inlet-side feeding of a web-format substrate. A cross-cutting device cuts the web-format substrate into sheet-format substrate sections. At the outlet, the substrate sections can be provided for subsequent processing or output to a delivery unit.

In addition, some examples relate to a machine for treating and/or processing a web-format substrate, and that includes a first machine part that comprises a roll unwinder for the inlet-side feeding of the web-format substrate. A cross-cutting device cuts the web-format substrate into sheet-format substrate sections that can be stacked at an outlet.

Furthermore, some examples relate to a method that includes processing a web-format substrate that is unwound from a substrate roll storing the substrate and provided with a barrier layer. The substrate is cut into substrate sections by a cross-cutting device and the substrate sections are combined downstream in a delivery device to form one or more stacks.

BACKGROUND

A machine for treating and/or processing web-format substrate is known from WO 2020/064230 A1, wherein a substrate roll is unwound on the inlet side, fed to a cross-cutting device downstream, where the roll is cut into substrate portions, these portions are fed to an inspection and, based on the result of the inspection, are deposited onto different piles at the downstream end of the machine in a multi-pile delivery unit. In one embodiment, the substrate web is printed on the upper side thereof even before being cross-cut, wherein the substrate portions arising after cross-cutting are printed once or multiple times downstream on the same substrate side by one or more printing devices.

DE 101 03 040 A1 discloses a device for forming a sequence of underlapping sheets, which are fed to a feed table of a downstream printing machine. On the inlet side, the device comprises a holding device, by which a paper roll is held and unwound, and a feed device, by which the paper web is fed to a cross-cutter via a supporting table. The resulting sheets are fed to the feed table of the printing machine via two conveyor belts and an underlapping device.

A method for producing printed sheets from a web is known from EP 3 878 652 A1, in which glue is supplied to a web and the web is provided with a film before being cut into sheets inline and being printed.

DE 10 2009 061 056 A1 relates to a web-fed printing machine comprising two ink jet printing units for double-sided ink jet printing, wherein a dryer is arranged downstream from each ink jet printing unit in the web path. A post-processing operation follows the ink jet printing units and dryers, in which webs are folded, cut into sheets, and the sheets are subsequently fed to a delivery module. It is possible for multiple partial webs obtained by longitudinal cutting to be placed on top of one another over turner bars on the inlet side of the delivery module.

A web-fed printing machine comprising different exchangeable printing and processing units using, for example, different printing methods and a die-cutting process is disclosed by CN 1 01 524 912 A, wherein the printed and processed web is rolled up again on the outlet side.

A printing machine comprising multiple units, in particular a roll unwinder, a printing device, a dryer, a cooling and buffering device, and a longitudinal cutting device, is disclosed in CN 1 05 196 696 A. The units are controlled via a programmable control system.

DE 20 2012 102 681 U1 discloses a web-fed printing machine for printing a material web unwound from a roll, in particular made of paperboard, comprising a printing mechanism and a coating mechanism arranged downstream from the printing mechanism, wherein, in one embodiment, the printed and coated web is rolled up again downstream or, in another embodiment, can be cut into pieces by a cross-cutter and stacked by a stacker.

DE 103 51 305 A1 seeks to make high-value printing processes, such as can be achieved when printing sheets, available for use with comparatively low-value printing materials. For this purpose, a web-fed rotary printing machine is provided, on which an enhancement can be made to a low-value printing material before the printing process. A multiplicity of options for enhancement in the web-fed printing machine are listed, such as priming, lamination or film embossing. In the succeeding sheet-fed printing machine, a further print image is applied to the coatings, printings, or release layers already deposited. Following the printing operation, it is described that a varnish can be applied.

In EP 2 628 593 A1, the flexibility when printing labels or folder-type boxes is to be increased, in particular when creating special optical effects by the printed image or the printed text. The document achieves this by a modular design of a narrow-web label printing machine comprising a processing module that can be arranged on a carrier unit, at which a wide variety of functional units can be connected via an interface.

SUMMARY

It is an object of some examples herein to provide a device for providing sheet-format substrate sections, as well as a machine and a method for treating and/or processing a web-format substrate.

The object is achieved according to some examples herein by the device discussed above, which supplies a fluid to a first side of the web-format substrate for the formation of a barrier layer, such as a coating that prevents adjacent gaseous, liquid, or pasty media from entering or penetrating the substrate material. Two application devices may act on the same first side and may comprise coating units for supplying a varnish, forming the barrier layer, to the same first side of the web substrate. The coating units are provided in the substrate path of the web-format substrate between the roll unwinder and the cross-cutting device. A drying device is provided between the cross-cutting device and an upstream first coating unit, and a drying device may be provided in the substrate path between the two coating units for further accelerating the drying and/or curing process.

Additionally, some examples include the above-discussed machine for treating and/or processing web-format substrate for forming a barrier layer in the manner of a coating that prevents adjacent gaseous, liquid, or pasty media from entering or penetrating the substrate material. Two application devices acting on the same first side, and including coating units for supplying varnish, form the barrier layer on the same first side of the printing substrate web and are provided in the substrate path of the web-format substrate between the roll unwinder and the cross-cutting device. A drying device may be provided between the cross-cutting device and an upstream first coating unit and/or a drying device may be provided in the substrate path between the two coating units. In the substrate path between the cross-cutting device and the delivery device, one or a plurality of sheet printing mechanisms may be provided, and by which a print image can be printed on the substrate sections on the second side thereof, located opposite to the first side.

In addition, some examples include a method for treating and/or processing a web-format substrate with a barrier layer that prevents adjacent gaseous, liquid, or pasty medium from entering or penetrating the substrate material on a first side, which in the product later forms the rear or inner side. For instance, a varnish forming the barrier layer may be applied multiple times onto the first side of the web-format substrate, which in the product later forms the rear or inner side, over the full surface or at least a large surface area, e.g., on the entire or at least 80% of the multiple-up surface of the substrate, by way of a plurality of application devices formed by coating units and in a total layer thickness of at least 5 μm. Additionally, the web-format substrate to which the varnish has been supplied, and downstream from each coating unit, may be at least superficially dried and/or cured by at least one device, e.g., a drying device, for accelerating the drying and/or curing process at least in the region of the varnish application.

The advantages achievable by the invention are, in particular, that sheet-format substrate produced from web-format substrate by the device or machine and possibly subsequently processed, for example printed, can be provided, which underwent a surface finishing or pretreatment operation, for example a large-surface-area or even full-surface fluid application, prior to the cutting operation, for example inline. The surface finishing or pretreatment operation by way of the fluid application is carried out by a corresponding device, for example an application device, by which a fluid, for example in the manner of a liquid or pasty substance or substance mixture or a fluidized powder, can be applied onto the substrate.

The solution according to the invention is particularly advantageous in the area of applications for which a barrier layer is required on a first side of the substrate, for example what is later the rear side of a printed product or inner side of a hollow body, which prevents adjacent gaseous, liquid or pasty media from penetrating into or even passing through the substrate material. In this case, the applied fluid forms a barrier layer in the manner of a coating, in particular after drying and/or curing. Such applications can be found not only, but especially in the packaging sector, in particular in the food industry. By way of the solution according to the invention, it is possible to provide such a barrier layer in a method that is easy to carry out, without the barrier layer, as has often been customary up until now, being implemented by lamination with a film. For the food sector, for example, a water-based varnish approved for the food industry or a still liquid plastic material, such as polyurethanes or casting resins, is a possible choice as a surface finishing medium. As an alternative to a varnish or plastic layer resting on the substrate, for example, in the manner of a coating, an application of a fluid that has at least partially penetrated into the substrate, for example in the manner of an impregnation, can be provided. In machines to be especially preferred, the full-surface or at least large-surface-area application of the barrier on the one side, for example what is later the product inner side, and the printing of a print image on the other side, for example what is later the visible product outer side, can be carried out inline, that is, in one continuous operation.

A device according to some examples for providing sheet-format substrate sections, which are in particular provided with a barrier layer on the rear side or what is later the inner side, comprises a roll unwinder for feeding a web-format substrate on the inlet-side, exactly or at least two application devices, which are formed by coating units, in the substrate path of the web-format substrate between the roll unwinder and the cross-cutting device for supplying a varnish, forming a barrier layer, to the web-format substrate on the same first side, a drying device between the cross-cutting device and the, viewed upstream, first coating unit and/or a drying device in the substrate path between the two coating units, as well as a cross-cutting device, by which the web-format substrate, downstream from the varnish application, can be cut into sheet-format substrate sections and the outlet of which can provide these substrate sections for subsequent processing or output to a delivery unit. Except for the application devices applying the barrier layer to the first side, preferably no further application devices are provided in this substrate path portion between the roll unwinder and the cross-cutting device, so that only substrate sheets, which are provided for later printing, but are pretreated on the rear side, that is, provided with a barrier layer, are provided behind the cross-cutting device.

By applying varnish at least twice, including intermediate drying and/or post-drying, the thicknesses required for the use according to the invention can be achieved particularly well, and a possibility of replacing laminated plastic films can thus be created.

In an embodiment according to the invention of a machine for treating and/or processing web-format substrate, this machine comprises a first machine part comprising a roll unwinder for feeding the web-format substrate on the inlet-side, at least one application device for supplying a fluid, forming a barrier layer, to a first side of the web-format substrate, and a cross-cutting device for cutting the web-format substrate into sheet-format substrate sections, and a second machine part, immediately following the first machine part, including a substrate path leading the substrate sections through the second machine part, at which the substrate sections emerging from the cross-cutting device are transferred inline and which, on the outlet side, leads into a delivery device in which substrate sections treated and/or processed in the machine can be received, wherein the machine, in the substrate path of the first machine part between the cross-cutting device and, viewed upstream, the only or first application device, comprises a device accelerating the drying and/or curing process, a drying device for short, and, in the substrate path between the cross-cutting device and the delivery device, one or more sheet printing mechanisms and/or one or more sheet coating units are provided, by which a print image can be printed on or varnish can be supplied to the substrate sections on the second side thereof, located opposite the first side.

So as to produce a substrate section comprising such a layer, in particular barrier layer, web-format substrate is unwound from a substrate roll storing the substrate and provided with a barrier layer on a first side, which in the product later forms the rear or inner side, in that a fluid forming the barrier layer is applied once or multiple times onto the first side of the web-format substrate, which in particular in the product later forms the rear or inner side, by way of one or more application devices, in a total layer thickness of at least 5 μm, the web-format substrate to which the fluid has been supplied, downstream from the or each application device, is at least superficially dried and/or cured by at least one device accelerating the drying and/or curing process, at least in the region of the fluid application, the substrate to which the fluid has been supplied, including the at least superficially dried and/or cured fluid, is cut into substrate sections by a cross-cutting device, and the substrate sections are combined downstream in a delivery device to form one or more piles.

Preferably, a layer, for example ink layer, or in particular a varnish layer, having a thickness of at least 5 μm, in particular at least 8 μm, is generated by the at least one application device, that is, by one or more such application devices, on the first side. The thickness of the applied and dried layer can be up to 12 μm, in particular up to 15 μm.

However, the solution according to the invention can also advantageously be used for other surface finishing applications in which, for example on the product rear side or, in the case of the device, possibly on the product front side or, for example a coating to protect the substrate surface, to reinforce the substrate or to provide large-surface-area or full-surface optical or haptic effects is to be provided.

Even though the device for providing finished substrate sheets on piles or in stock can merely be designed with devices for surface finishing and for cutting substrate sheets in the manner of a "standalone" machine, in a particularly advantageous refinement of a machine, for example a combination machine, at least one further device for processing, in particular printing and/or coating, the sheet-format substrate is provided downstream from the cross-cutting operation, in particular at least on the second substrate side located opposite the above-described surface finishing or coating operation, by which one or more further processing steps, in particular a multi-color printing operation, can be carried out inline in the machine, downstream from the cross-cutting operation.

The designation as "first" and "second" sides of the substrate here only serve to better distinguish the terminology and could likewise be selected the other way around.

In one embodiment of the device or machine, the at least one application device is arranged in the substrate path in such a way and/or the substrate path configuration from the at least one application device into the cross-cutting device is designed in such a way that the substrate acted upon by the at least one application device on the first side leaves the cross-cutting device with the first side, that is, the side having fluid supplied thereto, pointing downwardly.

In an above-described variant embodiment of the machine, for example as a combination machine, in which it is designed with a printing machine, in particular a sheet-fed printing machine, comprising one or more processing devices configured as printing mechanisms and an upstream coating section, in particular web coating section, so that printing and/or varnishing of the sheets can be carried out inline together with the surface finishing or coating of the substrate which is still in the web format, it is possible, in an advantageous, to selectively introduce and remove respective application and drying devices into and from the substrate path between the inlet-side web feed and the cross-cutter arranged upstream from the downstream printing mechanisms and/or coating units, in each case individually or as a joint unit for finishing. In this way, an operation of the machine with, or also without, such a surface finishing operation is possible, without having to pass through such devices unnecessarily in "idle." In one variant, such units cannot just be introduced and removed for this purpose, but can be replaced with different units or be supplemented by further units.

The selective and/or additional introduction and removal can, of course, also be employed for the above-described case of a so-called standalone embodiment, that is, in the embodiment without one or more processing devices arranged downstream from the cross-cutting operation, for example so as to provide only a machine that creates sheets from a web.

In a particularly preferred embodiment, an application device that is suitable for a large-surface-area or preferably full-surface application can be provided as an above-described application device for surface finishing, which, for example, is designed as a printing mechanism, or in particular a coating unit, acting upon a large surface area or the full surface of the substrate.

In the present connection, the term "full-surface" shall be understood to mean the complete application onto at least the surface of the substrate which is taken up by the multiple-up or multiple-ups to be obtained from the substrate. The large-surface-area printing shall be understood to mean full-surface printing within the above meaning where, however, at least 80% of the above surface is acted upon and/or one or more individual surface regions, for example no more than 10 per multiple-up, within the multiple-up or multiple-ups, which, for example, in the product later end up in the region of splices and/or which, for example, in sum take up less than 20% of the particular multiple-up surface, are omitted in the particular multiple-up.

Even though generally an arbitrarily designed application mechanism can be provided as the application device, in a particularly advantageous embodiment it is designed as an application mechanism operating according to a letterpress printing process, in particular flexographic printing process, in particular a coating unit, comprising a letterpress forme, for example a so-called varnishing plate.

In the event that multiple of the application devices serving surface finishing purposes are arranged upstream from the cross-cutting operation, preferably at least one device accelerating the drying and/or curing process can be or have been provided in the substrate path between two respective devices used for surface finishing.

BRIEF DESCRIPTION OF THE DRAWINGS

Exemplary embodiments of the invention are illustrated in the drawings and will be described in greater detail below. The drawings show.

DETAILED DESCRIPTION

Figure 1:
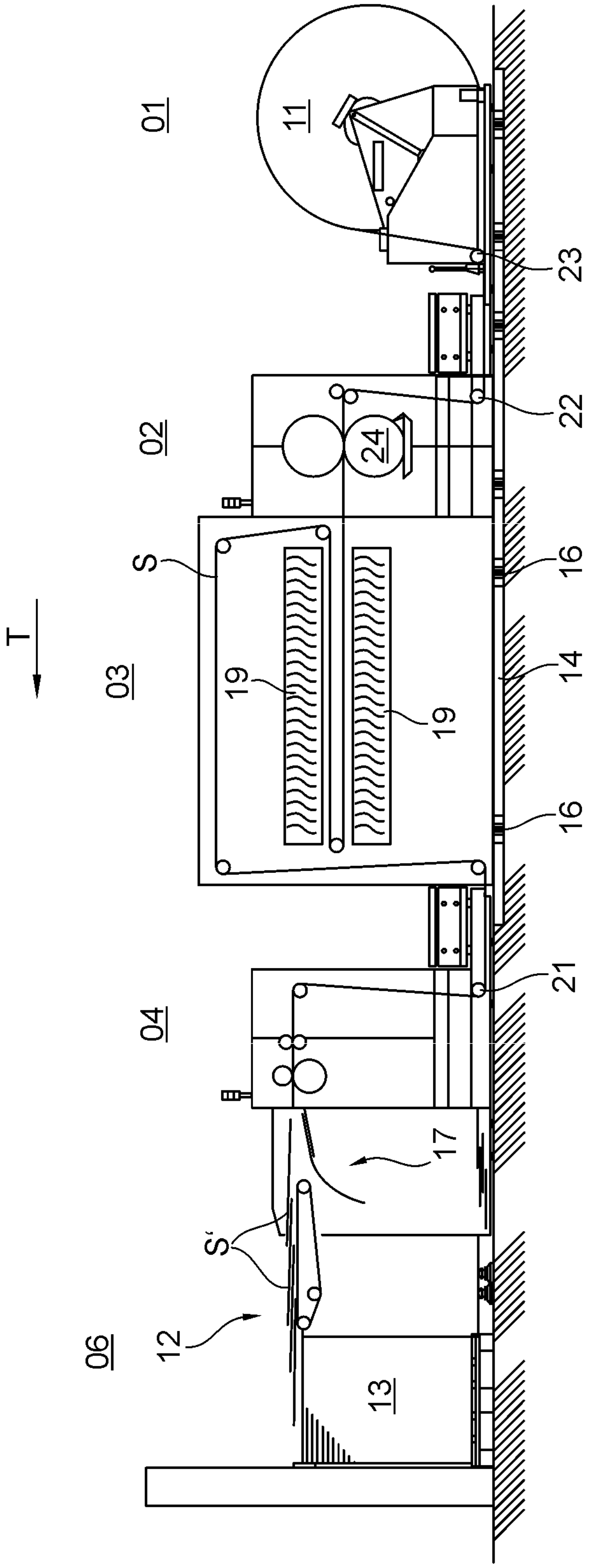
FIG. 1 a machine for treating and/or processing web-format substrate in a first embodiment having a horizontal web path at the application nip.

A device for providing sheet-format substrate sections or a machine for treating and/or processing web-format substrate S, for example a substrate web S, comprises, on the inlet side, a device 01 for the inlet-side feeding of the web-format substrate S to be unwound, for example, from a substrate roll 11, for example a so-called roll unwinder 01. In a particularly advantageous embodiment, this roll unwinder is configured as a reel changer 01 for the "flying", that is, uninterrupted, roll change (for example, shown by way of example in FIG. 3 as an advantageous refinement for all described variant embodiments of the machine).

By way of the device or machine, the inlet-side web-format substrate S can be treated and/or processed so as to yield a product that is present on the outlet side as a sheet-format substrate S', in particular as an intermediate product of an end product to be produced from the sheet-format substrate S' by subsequent processing.

Downstream in the substrate path of the still web-format substrate S, the device or machine comprises at least one substrate-processing device in the form of an application device 02; 02', in particular an application mechanism 02; 02', for finishing a first side of the web-format substrate S or supplying a fluid thereto. In the process, in particular prior to the cutting operation, an in particular large-surface-area or even full-surface fluid application is carried out inline, that is, the application of a fluid, for example, in the manner of a liquid or pasty substance or substance mixture or of a fluidized powder. The application device 02; 02' is preferably designed in the manner of a printing mechanism or in particular of a coating unit 02; 02'.

Figure 2:
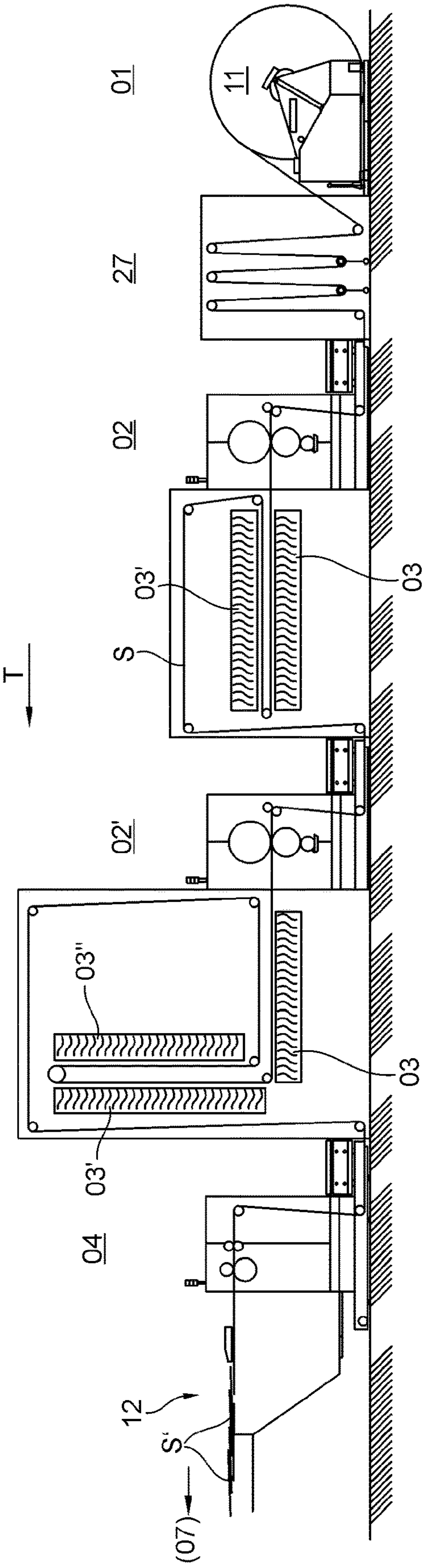
FIG. 2 a machine for treating and/or processing web-format substrate in a second embodiment comprising two application devices and having a horizontal web path at the respective application nip.
Figure 5:
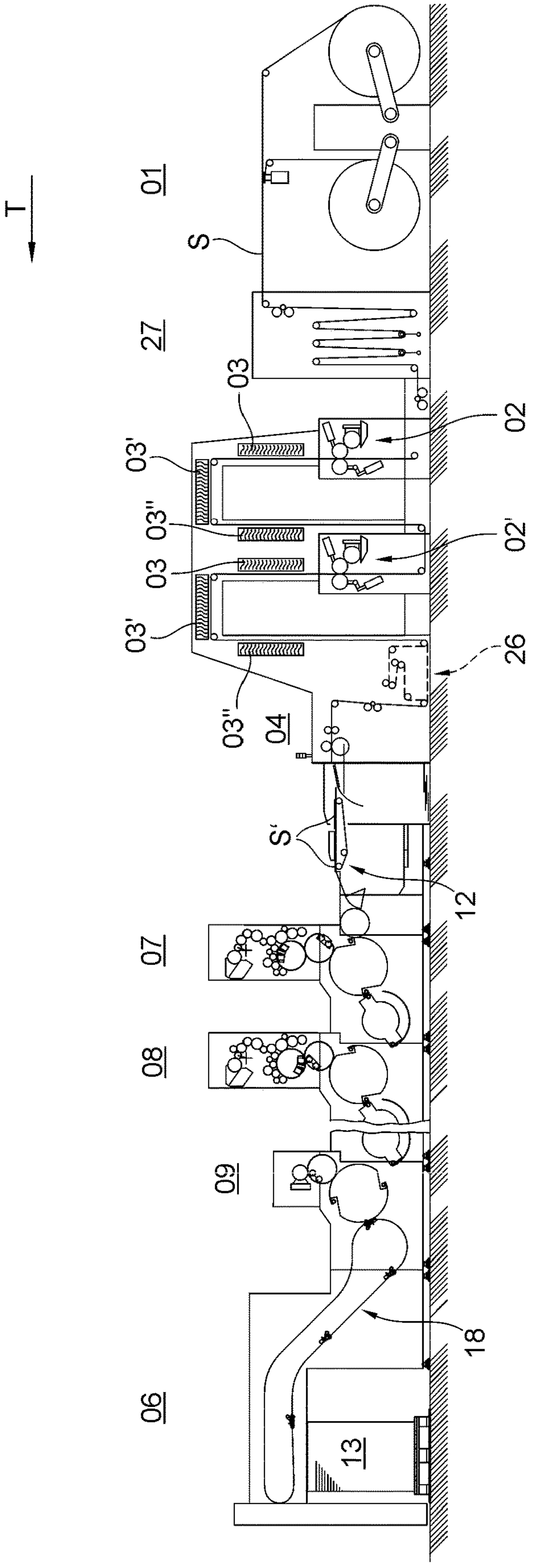
FIG. 5 a machine for treating and/or processing web-format substrate in a fourth embodiment comprising sheet printing mechanisms arranged downstream inline.
Figure 6:
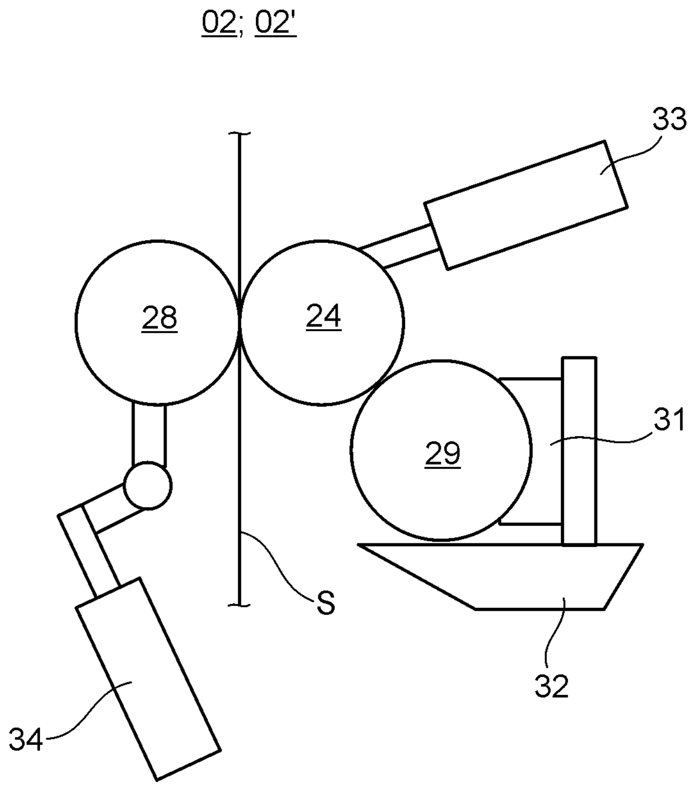
FIG. 6 an enlarged illustration of an application mechanism operating according to the flexographic printing process, comprising an anilox roller and a chamber doctor blade.

The printing mechanism or coating unit 02; 02' is preferably implemented in the design of a flexographic, gravure or screen printing mechanism, in particular preferably in the manner of a flexographic printing mechanism or coating unit, hereafter also summarized as a flexographic mechanism for short. Such mechanisms are, for example, shown by way of example in FIG. 2, FIG. 3, and FIG. 5 as a particularly preferred refinement for all variant embodiments of the machine. FIG. 2 depicts, by way of example, a flexographic mechanism in the manner of an open system, and FIG. 3 as well as FIG. 5 depict, by way of example, a flexographic mechanism in the manner of a closed system shown in an enlarged illustration, for example, in FIG. 6, wherein, however, the open flexographic mechanisms shown in Fig. can be replaced by closed systems shown by way of example in FIG. 3 or FIG. 5 and, vice versa, the closed systems from FIG. 3 and FIG. 5 can be replaced by such from FIG. 2.

Figure 4:
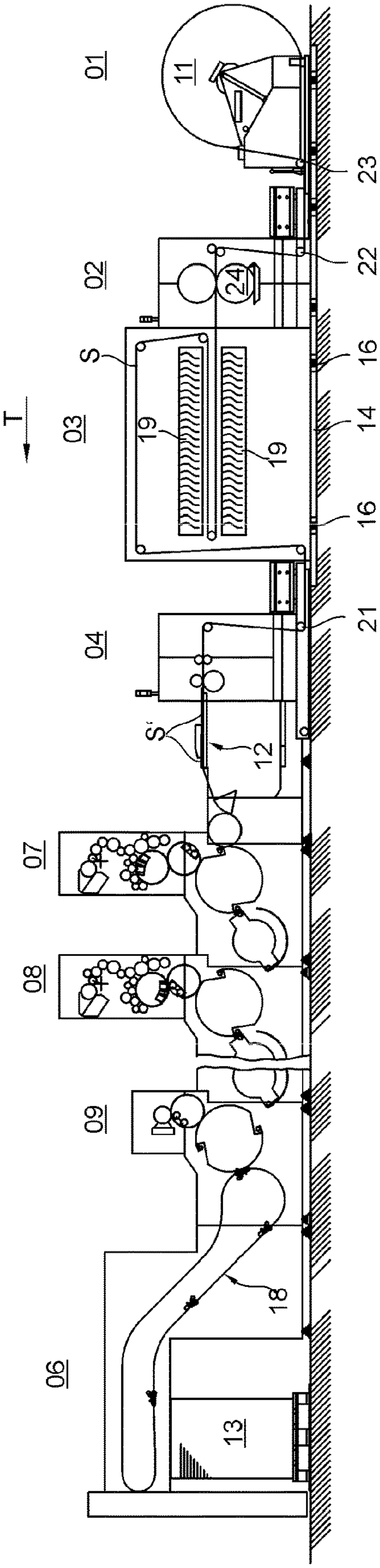
FIG. 4 a machine for treating and/or processing web-format substrate in a fourth embodiment comprising sheet printing mechanisms arranged downstream inline.

FIG. 1 and FIG. 4, likewise by way of example, alternatively show the application device 02; 02' for all described variant embodiments of the machine with a configuration of the application mechanism 02; 02' in the manner of a gravure printing mechanism. A separate illustration of the advantageous alternative as a screen-printing mechanism which can likewise be applied to all variant embodiments was dispensed with here. Generally, the application device 02; 02', however, could also be implemented as an offset printing mechanism or as an application device 02; 02' suitable in another manner as long as a minimum thickness of the fluid application of, for example, at least 5 μm, in particular at least 8 μm is ensured. For this case as well, an application device 02; 02' operating according to a non-impact method or in a plateless manner is conceivable if, for example, enhanced variability in the position of spots on the substrate S; S' which are not to be coated, for example because these are to be provided with glue afterwards, is to be made possible. Even though, in the case of multiple application devices 02; 02', generally different types can be combined with one another, preferably application devices 02; 02' of the same type are preferred.

By way of the preferred design of the application mechanism 02; 02', in particular coating unit 02; 02', in the design of a letterpress, gravure- or screen-printing mechanism, a comparatively thick fluid layer can be applied. This applies in particular to the design in the manner of a letterpress printing mechanism, in particular flexographic mechanism, or most particularly preferably an application mechanism 02; 02' operating according to the screen-printing method, wherein, in particular in the case of the latter, a required high fluid thickness can possibly already be applied by a one-time application. The application mechanism 02; 02' preferably designed in the manner of a letterpress mechanism, in particular flexographic mechanism, comprises an application cylinder 24, for example a forme cylinder 24, in particular a varnishing cylinder 24, which carries a letterpress forme, for example of a so-called varnishing forme or varnishing plate, around the circumference. The application cylinder 24, in particular varnishing cylinder 24, cooperates via a substrate web S to be acted upon with a further cylinder 28, for example an impression cylinder 28, and forms an application nip therewith. The application or varnishing cylinder 24 receives the fluid, in particular the varnish, via one or more rollers 29. In one embodiment of the flexographic mechanism, for example also referred to as an open design, the application or varnishing cylinder 24 receives the fluid, for example, directly or indirectly via an intermediate roller, which is not shown here, for example a chromium roller, from a dipping roller which is immersed into a fluid reservoir, for example an ink fountain. In an embodiment that is preferred here, for example also referred to as a closed design, the application or varnishing cylinder 24 receives the fluid via an anilox roller 29 which, in turn, cooperates upstream with a doctor blade 31, in particular a chamber doctor blade 31 (see FIG. 6, for example). So as to collect potentially excess or egressing fluid, a collecting receptacle 32 can be provided beneath the chamber doctor blade. The application and impression cylinders 24; 28 can be set against one another over the substrate web S by an actuator 33 positioning the application cylinder 24 and/or by an actuator 34 positioning the impression cylinder 28.

So as to provide large-surface-area barrier layers or visual effects, the application device 02; 02' or a printing forme or in particular varnishing forme received on the forme cylinder 24, for example in contrast to printing mechanisms for printing finely structured image motifs or alphanumerical symbols, is in particular equipped to supply the fluid to at least one surface of the substrate S over the full surface or large surface area in such a way that an application takes place at least on the entire or at least 80% of the surface of the substrate S which is taken up by the multiple-up or multiple-ups to be obtained from the substrate S; S' or corresponds to at least 80% of this surface. The entire surface is relevant, for example, when the multiple-ups on the relevant side are to be completely protected, that is without interruption, or to be provided with the effect. An application with omissions can be particularly advantageous when, such as in package printing, multiple-ups for the production of three-dimensional hollow bodies are to be glued in the region of splices after a folding operation.

So as to achieve an above-described full-surface or large-surface-area fluid application, the application device 02; 02' is formed, for example, by a printing mechanism or coating unit 02; 02', the printing or varnishing forme of which provided on, for example, a forme cylinder 24 cooperating indirectly or directly with the substrate S, S', on the printing width and printing length corresponding to the multiple-up or multiple-ups has a print motif (that is, the distribution of the printing surface regions) for full-surface printing or application, based on the surface area of the multiple-up or multiple-ups, or a print motif having a print-free surface area of less than 20%, based on the surface area of the multiple-up or multiple-ups. Based on and due to the frequently existing similarity between printing mechanisms and coating units, for the sake of simplicity the distribution of the surface regions to which the fluid is to be supplied in the case of the print motif shall also be understood to apply when the application device 02; 02' is designed as a coating unit 02; 02'.

For example, a water-based varnish which is, for example, approved for the food industry, or a plastic material that is still liquid, such as polyurethanes or casting resins, is provided as the fluid for the surface finishing operation or the treatment. As an alternative to a varnish or plastic material resting on the substrate, for example, in the manner of a coating, however, in another embodiment or for a different use a fluid that has at least partially penetrated into the substrate S; S', for example in the manner of an impregnating agent, can be provided as the fluid.

Viewed with respect to a transport direction T of the substrate S; S', downstream from the only or last application device 02; 02', in particular in the substrate path of the web-format substrate S, a device 04 for cutting the substrate web S into substrate sections S', for example a cross-cutting device 04 or a so-called cutting mechanism 04, is provided in the substrate path, by which the web-format substrate S, to which the fluid has been supplied and which preferably has been at least superficially cured, is cut into sheet-format substrate sections S'. In a preferred embodiment, the cross-cutting device 04 is equipped to sever substrate sections S' having different desired section lengths. It is possible for multiple application devices 02; 02', for example of a different type or preferably of the same type, carrying out an application to the same substrate side, to be provided in the substrate path of the web-format substrate S or in the substrate path arranged upstream from the cross-cutting device 04 (for example, shown, by way of example, in FIG. 2, FIG. 3 and FIG. 5 as an advantageous refinement for all described variant embodiments of the machine for the case of two application devices 02; 02' of the same type, here, by way of example, in the form of flexographic mechanisms, that is, flexographic printing mechanisms or in particular flexographic coating units).

The substrate S; S' is formed, for example, by cellulose-based or cellulose-containing material composed of one layer or multiple layers, for example by paper, cardboard or paperboard.

An embodiment of the machine in which the machine, between the device 01 for the inlet-side feeding of the web-format substrate S and the cross-cutting device 04, comprises at least one device 03; 03' accelerating the drying and/or curing process, for example at least one drying device 03; 03', is most particularly advantageous. At least one such device 03; 03' is preferably arranged on the side of the substrate path that faces the first side, that is, the side to which the fluid was previously supplied upstream by the or an above-described application device 02; 02', in particular during the treatment and/or processing step provided directly upstream or directly upstream in the substrate transport path. With this, the surface finishing application, in particular the barrier layer, is fixed even prior to succeeding mechanical stress, and, for example, is at least superficially dried and/or cured. In an advantageous refinement, multiple such drying devices 03; 03'; 03" can be arranged downstream from the or the same application device 02; 02' in the substrate path on the freshly acted-upon first side of the substrate S (for example shown, by way of example, as a refinement for all described variant embodiments of the machine in FIG. 1, on the right side of FIG. 2 and in FIG. 4 for two devices, and on the left side of FIG. 2, in FIG. 3 and in FIG. 5 by way of example even for three devices 03; 03'; 03" adjoining the same application device 02; 02' and accelerating the drying and/or curing process, for example drying devices 03; 03'; 03").

In addition to one or multiple above-described devices 03; 03'; 03" accelerating the drying and/or curing process, at least one further device accelerating the drying and/or curing process, which, however, is not shown here, in particular at least one drying device, can be provided in the substrate path on the second side of the substrate S, which is still in the web format, located opposite the side to which the fluid has been freshly supplied.

The latter is of particular advantage not just, but especially in connection with a refinement of the machine, which is not shown and in which at least one further application device (not shown), in particular for the large-surface-area or full-surface application of fluid, is arranged in the substrate path upstream from the cross-cutting device 04 on the side of the substrate path located on the second side of the substrate S, that is, on the side that is located opposite the first side of the substrate S that has been acted upon at least once or multiple times by one or more application devices 02; 02'. Supplying the second side of the substrate S in this way can serve surface finishing purposes, for example, either forming a fluid barrier also on this side or, for example, forming a large-surface-area or full-surface background color.

The or at least one, multiple or all of the above-described drying devices 03; 03'; 03" can advantageously be operated in a contactless manner, that is, without contact with the substrate S, and preferably be configured as dryer elements operating in a radiation-based manner, for example IR-based or UV radiation-based manner, with one or more corresponding radiation sources 19 or, as an alternative, operating in a hot air-based manner. One or more such drying devices 03; 03'; 03", which are possibly not separated from one another by an application device 02; 02' in the substrate path, can be accommodated in a unit referred to as a dryer, for example radiation or hot air dryer, or can be combined, if multiple such drying devices 03; 03'; 03" are present.

On the outlet side of the cross-cutting device 04, the substrate sections S', which have been surface-finished at least on one side or, for example, to which fluid has been supplied once or multiple times, and which preferably have been dried or cured at least superficially, are fed indirectly or directly via one or more suitable conveying devices 12; 18 to a delivery device 06, for example a pile delivery 06, in the form of a sheet-format substrate S', or substrate sheet S' for short, in which sheet-format substrate sections S' obtained in the machine by treatment and/or processing are delivered, in particular combined into piles 13.

If substrate sheets S' delivered as intermediate products are subsequently processed in a separate machine, for example a standalone machine, or if the other, second side of the substrate S; S', for example what is later the product outer side, is subsequently processed inline in the same web-treating and/or web-processing machine, for example printed and/or coated once or multiple times, an embodiment of the machine or the arrangement of the at least one application device 02; 02' and configuration of the substrate path in which the substrate S; S' leaves the cross-cutting device 04 with the acted-upon or surface-finished first side pointing downwardly, that is, with the side pointing downwardly to which the fluid was supplied or which was surface-finished by the one or more application devices 02; 02' and/or which in the product later, for example the cavity-forming product, forms the inner side, is particularly advantageous. With this, after the cross-cutting operation, the substrate sheets S' are present in the form of substrate sections S', which can be stacked with the first side thereof, which has been surface-finished or protected by a barrier layer, pointing downwardly and, in a later work step in another machine or advantageously directly thereafter, can be processed inline once or multiple times, for example be printed and/or coated on the upper side thereof, with the first side pointing downwardly.

For this purpose, in a first advantageous embodiment, the application device 02 or application devices 02; 02' acting upon the first side can be arranged in the substrate path in such a way that the relevant application device 02; 02', in particular with a predominantly horizontal substrate path progression at the application nip, is situated with the application cylinder 24 at the substrate path beneath the substrate path or, in particular with a predominantly vertical substrate path progression at the application nip, is situated at the substrate path on the side facing away from the device for the inlet-side feeding 01, and/or that it prints the underside of the substrate S guided on the substrate path, that is, the side of the substrate S pointing downwardly in the region of the application nip and/or the side facing away from the device for the inlet-side feeding 01. The downwardly pointing side or underside, however, does not have to extend parallel to the horizontal, but can also extend at an incline with respect to the same.

In an alternative advantageous embodiment, in which the application device 02 or application devices 02; 02' acting upon the first side is or are arranged in the substrate path in such a way that the fluid-applying application mechanism of the relevant application device 02; 02', in particular with a predominantly horizontal substrate path progression at the application nip, that is, inclined <45° with respect to the horizontal, is located at the substrate path over the substrate path or, in particular with a predominantly vertical substrate path progression at the application nip, that is, inclined >45° with respect to the horizontal, is located at the substrate path on the side of the substrate path facing the device for the inlet-side feeding 01 and/or that it prints the upper side of the substrate S guided on the substrate path. Here as well, the upwardly pointing side or upper side does not have to extend parallel to the horizontal, but can also extend at an incline with respect to the same. In a preferred refinement, it is possible, not just but preferably in conjunction with this alternative embodiment, that a strand turning device 26, for example comprising two turner bars extending in particular so as to intersect one another at a right angle, is provided in the substrate path between the only, or downstream last, application device 02; 02' and the cross-cutting device 04. Such a device turns the, for example first, side of a substrate web S entering on the inlet-side as the upper side downwardly and, vice versa, turns the previously lower side, for example second side, upwardly. As an alternative, for the purpose of the turning process, a sheet turning device, for example a turning drum, can be provided in the substrate path between the cross-cutting device 04 and the delivery device 06, in particular upstream from a first printing mechanism or coating unit 07; 08; 09 (not shown in the figures here).

The above-mentioned position of the application device 02; 02' shall be the position of the fluid-conducting or fluid-applying parts of this application device 02; 02', for example, the above-described forme cylinder 24, including means supplying fluid thereto, or a non-impact printing device in the case of a platelessly operating application device 02; 02'. This applies regardless of whether a counterbearing, such as an impression cylinder or a supporting guide or even a fluid-conducting cylinder of a further printing mechanism or coating unit, for example supplying the same or another fluid to the second side, is provided on the opposite side of the substrate path.

After the cross-cutting operation, the substrate sheets S', which in particular have been surface-finished and/or coated in the above-described manner, are fed via one or more above-described conveying devices 12; 18 to the delivery device 06 or, in an alternative embodiment of the machine, are fed initially via at least one first conveying device 12 to one or more further application devices 07; 08; 09, for example one or more printing mechanisms 07; 08, in particular sheet printing mechanisms 07; 08, and/or one or more coating units 09, in particular sheet coating units 09, for further processing the then sheet-format substrate S', in particular on the second side thereof. The transport of the substrate sheets S' preferably takes place via a series of transport and impression cylinders by way of a successive sheet transfer from cylinder to cylinder through the one or more further application devices 07; 08; 09, and possibly between the same. In an embodiment of the machine comprising one or more printing mechanisms 07; 08 arranged downstream from the cross-cutting device 04, the machine can also be referred to as a printing machine, in particular a sheet printing machine, which comprises a surface finishing stretch arranged upstream from the at least one printing mechanism 07; 08, comprising at least one above-described application device 02; 02' and at least one above-described device 03; 03'; 03" accelerating the drying and/or curing process.

A first conveying device 12 directly following the cross-cutting device 04 is preferably designed as a belt table 12, in particular as a suction belt feed table 12, via which the substrate sheets S', for the case of further processing, the first or only printing mechanism or printing unit 07; 09 following the sheet feeder in the substrate path and, for the case that no subsequent processing is to be carried out inline, transfer unit provided directly the delivery device 06, or via a possibly provided transfer unit effectuating the transfer, to a second conveying device 18 encompassed by the delivery device 06, for example to a revolving chain gripper system 18. The conveyor device 12 is preferably, for example additionally, designed to condense the entering substrate sections S' to form an imbricated stream, in particular for the first case described (that is, with further processing) by underlapping the respective substrate section S' at the trailing end thereof with the leading end of the respective succeeding substrate section S' and/or, for the second case (that is, direct feeding into the delivery device 06), by imbricating the respective substrate section S' at the trailing end thereof with the leading end of the respective succeeding substrate section S'.

In an advantageous refinement, a substrate diverter 17, which is shown by way of example in FIG. 1, for example, and is also shown and denoted for the remaining embodiments, is provided in the substrate path downstream from the cross-cutting device 04 and upstream from the delivery device 06 or from a first or only printing mechanism or coating unit 07; 09 possibly following in the substrate path, by which, for example, scrap sheets judged as defective can be channeled out of the further substrate path.

Figure 3:
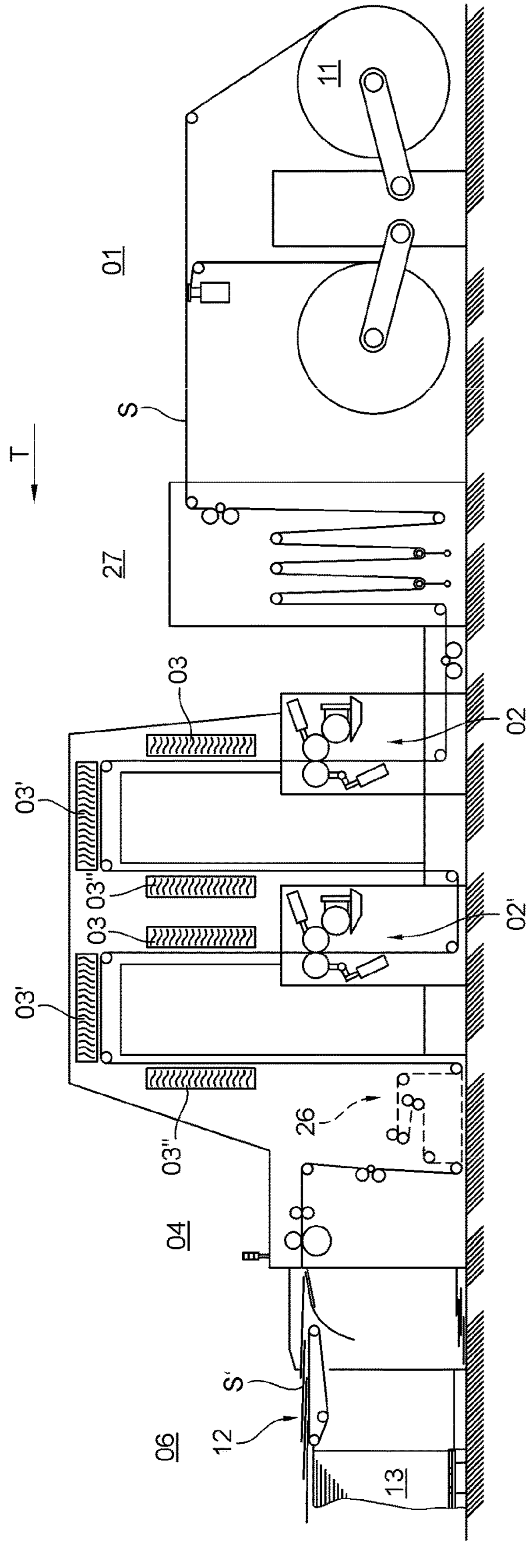
FIG. 3 a machine for treating and/or processing web-format substrate in a third embodiment comprising two application devices and having a vertical web path at the respective application nip.

Not only, but in particular in conjunction with a reel changer 01 designed for a flying reel change, in an advantageous embodiment a so-called web storage space 27, for example a substrate path that can be varied in the loop length of multiple web loops, can be provided between the device 01 for the inlet-side feeding and the only, or downstream first, application device 02; 02' (for example, shown by way of example in FIG. 3 as an advantageous refinement for all described variant embodiments of the machine).

In a particularly advantageous configuration of an above-described machine, in particular an inline machine or a combination machine, comprising both a machine part supplying fluid, in particular varnish, to the first side of the substrate web S once, or preferably multiple times, for example in the manner of a web-fed coating machine, in particular web-fed printing or coating machine, and a machine part situated downstream from the cross-cutting device 04, printing the substrate sheets S' on the second side once, or preferably multiple times, for the example in the manner of a sheet-fed printing machine, two application mechanisms 02; 02' are provided in the substrate path downstream from the roll unwinder 01, which is preferably designed for a flying change, and upstream from the cross-cutting device 04, which are designed in the manner of flexographic mechanisms, in particular flexographic coating units, and carry out an application to the same web side, each application mechanism comprising at least one drying device 03; 03'; 03" arranged directly downstream. As is shown by way of example, for example, in FIG. 5, these can be located, within the above meaning, on the side facing the device for the inlet-side feeding 01 or upper side, that is, on the side of the substrate S pointing upwardly in the region of the application nip, or, in an advantageous embodiment, which however is not shown separately here, on the underside, that is, on the side of the substrate S pointing downwardly in the region of the application nip and/or on the side facing away from the device for the inlet-side feeding 01. The flexographic mechanisms are preferably designed, for example in a closed manner, with the fluid supply taking place via an anilox roller 29 and a chamber doctor blade 31. For the advantageous case of an inline machine, one or preferably more printing mechanisms 07; 08 follow the cross-cutting device 04 downstream. It is also possible for more than two such application mechanisms 02; 02' to be provided. The application in the manner of a flexographic printing method usually enables high printing speeds, wherein in the case of two or more such application mechanisms 02; 02' better area coverage can also be achieved, in particular for the case of an application mechanism 02; 02' comprising an anilox roller 29.

In a modification of this particularly advantageous configuration of an above-described machine, in particular an inline machine, a single application mechanism 02 operating according to the screen printing method can be provided in the substrate path of the substrate web S, instead of two or more application mechanisms 02; 02' that operate according to a flexographic printing method and carry out an application to the same web side and that each comprise at least one succeeding drying device 03; 03'; 03". By way of the screen-printing method, a higher film thickness of the fluid forming the barrier layer can be applied in one operation.

In a most particularly advantageous refinement, the first application device 02 cooperating with the substrate web S and preferably the device 03 accelerating the drying and/or curing process can each be selectively introduced into the substrate path leading through the machine as a respective unit 02; 02'; 03; 03'; 03" or as a joint unit 02, 03; 02, 03, 03'; 02, 03, 03', 03"; 02', 03; 02', 03, 03'; 02', 03, 03', 03", forming a surface-finishing unit 02, 03; 02; 03, 03'; 02, 03, 03', 03"; 02', 03; 02', 03, 03'; 02', 03, 03', 03", for carrying out a first operating mode for forming a first operating configuration, and can be removed therefrom again for carrying out a second operating mode for forming a second operating configuration. The respective or joint unit 02; 02'; 03; 03'; 03"; 02, 03; 02, 03, 03'; 02, 03, 03', 03"; 02', 03; 02', 03, 03'; 02', 03, 03', 03" is designed in the manner of a module so as to be connectible at the upstream and downstream sides thereof to a previously prepared interface of the device 01; 04 adjoining upstream or downstream in the respective operating mode via a previously prepared interface without major installation effort.

The selective introduction or removal of such individual or combined units 02; 02'; 03; 03'; 03"; 02, 03; 02, 03, 03'; 02, 03, 03', 03"; 02', 03; 02', 03, 03'; 02', 03, 03', 03" can also be applied to above-described refinements, which comprise more than one application device 02; 02' and/or more than one device 03; 03'; 03" accelerating the drying and/or curing process. The units 02; 02'; 03; 03' 03" can each be selectively introducible and removable individually or in the form of groups, in each case with an application device 02; 02' and one or more devices 03; 03'; 03" accelerating the drying and/or curing process assigned thereafter to this application device 02; 02, or overall as a surface-finishing unit 02, 03; 02; 03, 03'; 02, 03, 03', 03"; 02', 03; 02', 03, 03'; 02', 03, 03', 03"; and the alike.

For this purpose, an upstream last web guide element 21 of the cross-cutting device 04 and a last, viewed upstream, web guide element 22 of the only or first application device 02 are preferably located in each case at a height, preferably the same height, so that the web-format substrate S can be fed from a downstream last web guide element 23 of the roll unwinder 01, if the application device 02 is or the application devices 02; 02' are present, and the device 03 or devices 03; 03'; 03" accelerating the drying and/or curing process, unimpeded to the upstream last web guide element 22 of the cross-cutting device 04 and, if present, unimpeded to the upstream last web guide element 22 of the only or, viewed upstream, last application device 02. In addition or instead, if a mechanical drive coupling exists between the at least one application device 02 and a drive system comprising the cross-cutting device 04, a mechanical interface toward the drive system can be prepared and, if a mechanical drive that is independent of the cross-cutting device 04 exists, an interface can be prepared to a line connection leading to an electronic master axis, for example a bus system.

For the removal and introduction of the joint or respective unit 02; 03; 02, 03, preferably a movement path including means enabling the movement, comprising, for example a rail system 16 and rolling elements at the unit 02; 02'; 03; 03'; 03"; 02, 03; 02, 03, 03'; 02, 03, 03', 03"; 02', 03; 02', 03, 03'; 02', 03, 03', 03"; 02, 03, 03', 03", 02', 03', 03" and so forth are provided, via which or by means of which the application device(s) 02; 02' and/or the device(s) 03; 03'; 03" accelerating the drying and/or curing process can in each case be moved laterally out of the machine alignment as a respective, as a grouped or as a joint unit 02; 02'; 03; 03'; 03"; 02, 03; 02, 03, 03'; 02, 03, 03', 03"; 02', 03; 02', 03, 03'; 02', 03, 03', 03"; 02, 03, 03', 03", 02', 03', 03" and so forth.

In addition, a movement path comprising means enabling the movement, comprising, for example, a rail system 14 and rolling elements arranged at the cross-cutting device 04 and/or preferably at the roll unwinder 01, can be provided, via which or by means of which, if the or all application devices 02; 02' and the or all drying devices 03; 03'; 03" or dryers are present, the roll unwinder 01 and the cross-cutting device 04 can be brought into a relative position in which these are more closely adjacent to one another, in particular by way of which the roll unwinder 01 can be moved further toward the cross-cutting device 04.

When treating and/or processing web-format substrate S, initially web-format substrate S is unwound from a substrate roll 11 storing the substrate, an above-described fluid is supplied once or multiple times to a first side of the web-format substrate S by at least one above-described application device 02; 02', the substrate S to which fluid has been supplied, after a respective application, is at least superficially dried and/or cured by at least one device 03; 03'; 03" accelerating the drying and/or curing process, and the substrate S to which fluid has been supplied and which includes the at least superficially dried and/or cured fluid is cut into substrate sections S' by a cross-cutting device 04. Downstream from the delivery device 06, the substrate sections S' are combined to form one or more piles 13.

In an advantageous refinement, the substrate sections S' are printed once or multiple times and/or coated once or multiple times inline on the second side, located opposite the first side, downstream from the cross-cutting operation and prior to being combined to form piles.

For a change in the operating mode, it may be advantageous for the changeover of the machine when the or all application devices 02; 02' and the drying device or devices 03; 03'; 03" are removed laterally from the machine alignment and from the substrate path and, for example after the application device 02 or application devices 02; 02' and the drying devices 03 or the drying devices 03; 03'; 03" have been removed, the cross-cutting device 04 and the roll unwinder 01 are brought into a relative position in which these are more closely adjacent to one another.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A device for providing sheet-format substrate sections (S'), comprising a roll unwinder (01) for inlet-side feeding of a web-format substrate(S) (S); at least one application device (02) for applying a fluid to a first side of the web-format substrate(S); a drying device (03; 03'; 03") for accelerating a drying and/or curing process, downstream from the at least one application device (02; 02'); and a cross-cutting device (04), by which the web-format substrate (S) can be cut into sheet-format substrate sections (S') and at an outlet of which these substrate sections (S') can be provided for subsequent processing or output to a delivery unit, wherein, for formation of a barrier layer in a manner of a coating that prevents adjacent gaseous, liquid, or pasty media from entering or penetrating the substrate material, two application devices (02; 02') acting on a same first side and formed by varnishing units (02; 02') that apply, to the same first side of the web-format substrate (S), varnish for forming the barrier layer as the coating that prevents adjacent gaseous, liquid, or pasty media from entering or penetrating the substrate material, wherein the varnishing units (02; 02') are provided in the substrate path of the web-format substrate(S) between the roll unwinder (01) and the cross-cutting device (04), and a drying device (03; 03'; 03") is provided between the cross-cutting device (04) and the, viewed upstream, first-coating varnishing unit (02; 02'), and a drying device (03; 03'; 03") is provided in the substrate path between the two varnishing units (02; 02').

2. The device according to claim 1, characterized in that only the varnishing units (02; 02') acting on the first side are provided as application devices (02; 02') in the substrate path between the roll unwinder (01) and the cross-cutting device (04).

3. The device according to claim 1, characterized in that the varnishing units (02; 02') are formed by flexographic varnishing units (02; 02').

4. The device according to claim 1, characterized in that the varnishing units (02; 02') acting on the first side of the substrate(S) are each equipped to apply varnish to the substrate(S) on at least a surface forming multiple-ups over a full surface or a large surface area in one operation, that is, in such a way that an application is carried out at least on an entire or at least 80% of the surface of the substrate(S) which is taken up by the multiple-up or multiple-ups provided on the substrate sections (S'), and/or that the application devices (02; 02') acting upon the first side of the substrate(S) are formed by varnishing units (02; 02'), a varnishing forme of which is provided on a respective forme cylinder (24), on a printing width and printing length corresponding to the multiple-up or multiple-ups, has a print motif for full-surface printing, based on a surface area of the multiple-up or multiple-ups, or a print motif having a print-free surface area of less than 20%, based on the surface area of the multiple-up or multiple-ups.

5. The device according to claim 1, characterized in that the varnishing units (02; 02') are arranged in the substrate path in such a way, and the substrate path configuration between the varnishing units (02; 02') and the downstream last varnishing unit (02; 02') to the cross-cutting device (04) are designed in such a way, that the substrate (S; S') acted upon by the varnishing units (02; 02') on the first side leaves the cross-cutting device (04) with the first side pointing downwardly.

6. The device according to claim 5, characterized in that the varnishing units (02; 02') acting upon the first side of the substrate(S) are arranged in the substrate path in such a way that the respective varnishing unit (02; 02'), at the site of the application, is situated beneath the substrate path or on the side of the substrate path which faces away from the device for the inlet-side feeding (01) and/or that the varnishing units (02; 02') apply the varnish to the underside of the substrate(S) guided on the substrate path, that is, to the first side of the two substrate sides which points downwardly.

7. The device according to claim 5, characterized in that the varnishing units (02; 02') acting upon the first side of the substrate(S) are arranged in the substrate path in such a way that the respective varnishing unit (02; 02'), at the site of the application, is situated above the substrate path or at the substrate path on a side of the substrate path which faces the device for the inlet-side feeding (01) and/or that the varnishing units (02; 02') print an upper side of the substrate(S) guided on the substrate path, that is, the side of the two substrate sides which points upwardly, and/or that a strand turning device (26) for reversing the web-format substrate (S) is provided in the substrate path between the downstream last varnishing unit (02; 02') and the cross-cutting device (04), by which the side of the web-format substrate (S) entering on the inlet-side as the upper side is turned downwardly and, vice versa, the previously lower side is turned upwardly.

8. A machine for treating and/or processing web-format substrate(S), comprising a first machine part which comprises a roll unwinder (01) for inlet-side feeding of the web-format substrate(S), at least one application device (02) for applying a fluid to a first side of the web-format substrate(S) and a cross-cutting device (04) for cutting the web-format substrate(S) into sheet-format substrate sections (S'), and comprising a second machine part, which immediately follows the first machine part and includes a substrate path leading the substrate sections (S') through the second machine part, at which the substrate sections (S') emerging from the cross-cutting device (04) are transferred inline and which, on an outlet side, leads into a delivery device (06) in which substrate sections (S') treated and/or processed in the machine can be received; the machine, in the substrate path of the first machine part between the cross-cutting device (04) and, viewed upstream, the only or first application device (02; 02'), comprising a drying device (03; 03'; 03") for accelerating the drying and/or curing process; in the first machine part, for formation of a barrier layer in a manner of a coating that prevents adjacent gaseous, liquid, or pasty media from entering or penetrating the substrate material, two application devices (02; 02') acting on the same first side and formed by varnishing units (02; 02') that apply, to the same first side of the web-format substrate (S), varnish for forming the barrier layer as the coating that prevents adjacent gaseous, liquid, or pasty media from entering or penetrating the substrate material, the varnishing units (02; 02') being provided in the substrate path of the web-format substrate (S') between the roll unwinder (01) and the cross-cutting device (04), and a drying device (03; 03'; 03") being provided between the cross-cutting device (04) and the, viewed upstream, first varnishing unit (02; 02') and a drying device (03; 03'; 03") being provided in the substrate path between the two varnishing units (02; 02'); and, in the substrate path between the cross-cutting device (04) and the delivery device (06), one or a plurality of sheet printing mechanisms (08; 09) being provided, by which a print image can be printed on the substrate sections (S') on a second side thereof, located opposite the first side.

9. The machine according to claim 8, characterized in that the varnishing units (02; 02') acting on the first side of the substrate(S) are equipped to apply the fluid to the substrate (S) on at least a surface forming multiple-ups over a full surface or a large surface area in one operation, that is, in such a way that an application is carried out at least on the entire or at least 80% of the surface of the substrate(S) which is taken up by the multiple-up or multiple-ups provided on the substrate sections (S').

10. The machine according to claim 8, characterized in that an application mechanism (02; 02') operating according to a flexographic printing method or according to a screen printing method is provided as the varnishing unit (02; 02') in the substrate path of the first machine part.

11. The machine according to claim 8, characterized in that, in the substrate path between the cross-cutting device (04) and the delivery device (06), one or a plurality of sheet coating units (09) are provided, by which varnish can be applied to the substrate sections (S') on the second side thereof, located opposite the first side.

12. The machine according to claim 8, characterized in that the first machine part for providing the sheet-format substrate sections (S') is configured so that the varnishing units (02; 02') acting upon the first side of the substrate(S) are arranged in the substrate path in such a way that a respective varnishing unit (02; 02'), at a site of application, is situated above the substrate path or at the substrate path on a side of the substrate path which faces a device for inlet-side feeding (01) and/or that the varnishing units (02; 02') print an upper side of the substrate(S) guided on the substrate path, that is, the side of the two substrate sides which points upwardly, and/or that a strand turning device (26) for reversing the web-format substrate(S) is provided in the substrate path between the downstream last coating unit (02; 02') and the cross-cutting device (04), by which the side of the web-format substrate(S) entering on the inlet-side as the upper side is turned downwardly and the previously lower side is turned upwardly.

13. The machine according to claim 8, characterized in that at least one varnishing unit (02; 02') cooperating with the web-format substrate (S) in the substrate path and at least one downstream drying device (03) accelerating the drying and/or curing process can each be removed from and introduced again into the substrate path leading through the machine and/or machine alignment individually as modules or together in one module, and that a movement path including means enabling the movement are provided, via which or by means of which the varnishing unit (02) and/or the drying device (03) accelerating the drying and/or curing process can be moved laterally out of the machine alignment as a respective or joint unit (02; 03; 02, 03), and/or that a movement path including means enabling the movement are provided, via which or by means of which the device (01) for the inlet-side feeding and the cross-cutting device (04) can be brought into a relative position in which these are more closely adjacent to one another after any varnishing unit (02; 02') and any drying device (03; 03'; 03") accelerating the drying and/or curing process has been removed from the substrate path and/or the machine alignment.

14. A method for treating and/or processing web-format substrate(S), wherein the web-format substrate(S) is unwound from a substrate roll (11) storing the substrate(S) and provided with a barrier layer that prevents adjacent gaseous, liquid, or pasty medium from entering or penetrating the substrate material on a first side, which in a product later forms a rear or inner side, in that a varnish forming the barrier layer is applied multiple times onto the first side of the web-format substrate(S), which in the product later forms the rear or inner side, over a full surface or at least a large surface area, that is, on an entire or at least 80% of a multiple-up surface of the substrate(S), by way of a plurality of application devices (02; 02') formed by varnishing units (02; 02'), in a total layer thickness of at least 5 μm;

the web-format substrate(S) to which the varnish has been applied, downstream from each varnishing unit (02; 02'), is at least superficially dried and/or cured by at least one drying device (03; 03'; 03") accelerating the drying and/or curing process, at least in a region of varnish application;

the web-format substrate(S) to which the varnish has been applied, including the at least superficially dried and/or cured varnish, is cut into substrate sections (S') by a cross-cutting device (04); and and the substrate sections (S') are combined downstream in a delivery device (06) to form one or a plurality of piles (13).

15. The method according to claim 14, characterized in that the substrate sections (S') leave the cross-cutting device (04) with the first side, to which the varnish has been applied, pointing downwardly, and/or are transported by a conveying device (12) from the cross-cutter (04) downstream into a sheet-treating and/or sheet-processing part, where the substrate sections (S') are printed once or multiple times and/or coated once or multiple times inline on the side thereof pointing upwardly and/or located opposite the first side and/or are stacked with the first side pointing downwardly in the delivery device (06).

* * * * *